Sept. 10, 1940.   E. MAY   2,214,143

ILLUMINATING DEVICE FOR PICTURE PROJECTION PURPOSES

Filed May 8, 1940

INVENTOR.
Erwin May
BY

Patented Sept. 10, 1940

2,214,143

UNITED STATES PATENT OFFICE 2,214,143

ILLUMINATING DEVICE FOR PICTURE PROJECTION PURPOSES

Erwin May, Wetzlar, Germany

Application May 8, 1940, Serial No. 333,927
In Germany June 23, 1938

1 Claim. (Cl. 176—16)

This invention relates to improvements in illuminating devices for picture projection purposes and the object of the invention is to provide a new projection lamp having greater light efficiency and in which material losses of light efficiency is avoided as compared with projection lamps heretofore used. To this end the invention is embodied in a lamp having a lamp bulb in the form of a prismatic hollow body with a plane parallel filament arranged for projection purposes. The most advantageous form of the bulb is that of a square. It is a feature of the invention that such a square formed lamp is placed with its corners or points in the optical axis of the illuminating system. In such position the angle of reflection at the glass surfaces exposed to the air are within the critical angle of total reflection assuming that the bulb is smaller than the reflecting mirror used in the projection apparatus. Such a square formed lamp with a suitable filament for projection purposes possesses great illuminating capacity to an extent not heretofore known in the art.

It may be pointed out that when ordinary standard circular or round lamp bulbs are used there is a great loss of light caused mainly by the dispersive effect of the wall of the bulb. Such loss of light increases outward from the optical axis of the illuminating system so that only such illuminating rays which pass through the very narrow zone adjacent the optical axis and such other illuminating rays which pass on the outside of the bulb image the source of light in an unobjectionable manner to cause an even illumination of the object such as a film in the film window of a projection apparatus. To this must be added that the surface reflection of the rays which strike the lamp bulb in a direction parallel to the optical axis is considerable. If the angle of incidence is 45 degrees the surface reflection will amount to 5%. With an angle of 60 degrees the surface reflection amounts to about 10% and thence may increase to about 100%. In the accompanying drawing illustrating the invention Fig. 1 illustrates diagrammatically an illuminating system for projection purposes including a projection lamp embodying the invention.

Figure 1:
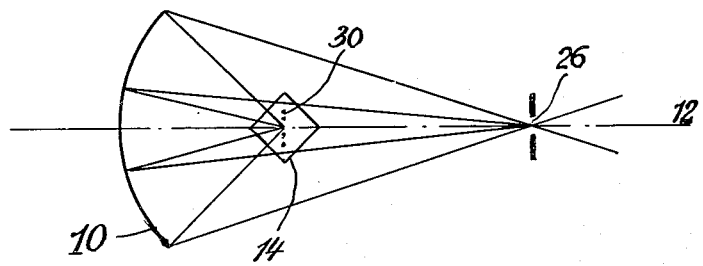
Figure 3:
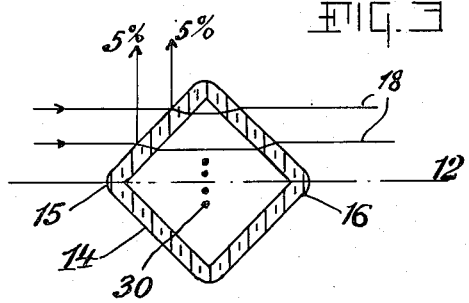
Fig. 3 is a cross sectional view of the lamp according to this invention having a square formed bulb with a plane parallel filament suitable for projection.
Figure 2:
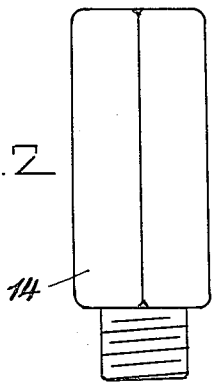
Fig. 2 is a side view of the lamp.

Fig. 3 illustrates the passage of the reflected rays which pass through the lamp bulb after being reflected from a mirror such as is shown at 10. The optical axis is marked 12. In order that the invention may be more easily understood only the rays which are parallel to the optical axis 12 are considered in explaining Fig. 3.

In Fig. 3 a lamp 14 with a bulb of square cross section and plane parallel sides is suitably supported with two of its opposite corners 15 and 16 in the optical axis 12 of the system. The lamp has a plane parallel filament 30 suitable for projection purposes. The passing rays are each bent and displaced to the same extent (as in the case of any plane parallel plate) and after passing through the bulb said rays are again bent and displaced back into their original positions as shown. Under such conditions it has been found that all rays at the four surfaces of the bulb are each weakened only about 5%. Consequently an even illuminating effect is obtained.

A square lamp bulb with a plane parallel filament for projection purposes accordling to this invention is very advantageous, has a small even loss of light, is more efficient and gives a better even illumination to an extent not heretofore known.

I claim:

In an illuminating device for picture projection purposes an incandescent projection lamp comprising a lamp bulb of square cross section with plane parallel sides and a monoplane filament within said bulb arranged at an angle to all the sides of the bulb and normal to the projection axis of the lamp, said lamp having two of its opposite edges in a plane perpendicular to the plane of the filament whereby light losses due to surface reflection on the bulb along said plane are uniform and less than ten per cent, resulting in a total increase in effective light intensity of said lamp for picture projection purposes.

ERWIN MAY.